Patented Nov. 1, 1932

1,885,563

UNITED STATES PATENT OFFICE

EMILE BORMANS, OF VILLEMONBLE, FRANCE, ASSIGNOR TO GEORGES TOURANCHET, OF VINCENNES, FRANCE

PROCESS OF UTILIZING IVORY SCRAP

No Drawing. Application filed July 1, 1930, Serial No. 465,238, and in Germany December 3, 1928.

This invention has for its object a process of utilizing ivory scrap resulting from the mechanical working of natural ivory with the object of obtaining products which can be used anew in the manufacture of articles such as billiard balls which are ordinarily produced from natural ivory.

The invention consists in effecting chemical combination of such ivory scrap with a synthetic resin so as to constitute a solid having the appearance and the essential properties of natural ivory.

With this object the ivory scrap is first subjected to a washing operation with dilute soda lye, then rinsed, and separated or classified according to size, whereupon each parcel of pieces of about the same size is subjected to the operations hereinafter enumerated for a duration depending on the size of the pieces.

The pieces which have been classified are mixed with phenol ($C_6H_5OH$) in the proportions of about five parts by weight of ivory scrap to one part of phenol and this mixture is subjected to the action of steam under a pressure of about 60 lbs. per square inch in an autoclave, preferably of the Chamberland type, for example. In treating pieces or chips having a volume which does not exceed 25 cubic centimetres this reaction is continued for about three hours.

When the reaction is completed, the pieces of ivory which have absorbed the major part of the phenol have become very friable and in consequence can be easily reduced to an impalpable powder of snow white colour.

The product reduced to powder, which I prefer to term "phenic ivory", can now be readily condensed with formaldehyde (H·CHO).

With this object 60 parts by weight of phenic ivory are mixed with 25 parts of phenol, 60 parts of formaldehyde and 10 parts of an alkaline catalyst and the mixture introduced into a condenser of the type commonly used in the manufacture of synthetic resins. Intimate admixture is effected by stirring and the mixture is brought to the boil; condensation takes place in a short time.

While the duration of condensation varies with the nature and quality of the ivory employed, the control of the reaction is quite easy as the mixture separates into two layers as soon as condensation takes place. As in the manufacture of ordinary synthetic resins the plastic product remains at the bottom while the catalyst liquid floats on top so that the plastic product which is of light yellow colour can be readily separated. To compensate for the difference in colour between the plastic product and natural ivory, there is added to the pasty mass a colouring body which may be one of the metallic oxides, oxide of zinc, for example.

It is to be noted that the condensation should not proceed to the limit but that the material should remain pasty so that it may be easily cast in moulds conforming to the articles to be produced.

The cast articles are baked in a "bakelizer" autoclave under a pressure of about 120 lbs. per square inch at a temperature of about 190° C. The duration of this baking operation is about four hours. The temperature should not exceed 200° C.

The steps of the process above described and the ingredients utilized may be varied without departure from the scope of the invention.

Notably there may be substituted for phenol one of the following products: naphtol $\alpha$ or $\beta$, cresylic acid, salol, resorcin or pyrogallic acid.

Again, in lieu of formaldehyde, there may be used one of the following products: trioxymethylene, paraformaldehyde, methylal, or hexamethylene-tetramine.

The catalyst preferred is ammonia in all its forms. The phenol used may be any one of the three commercial forms: liquid up to 90% in alcohol, snow or crystallized. Also products of the phenol family may be substituted for phenol in the preparation of the phenic ivory.

It is to be understood that the duration of the preparation of phenic ivory may be varied and that a longer time is taken if the pieces or chips or ivory have a volume greater than 25 cubic centimetres.

Masses of re-constituted ivory obtained as above described may be subjected, like natural ivory, to shaping operations with a saw or a file, to turning operations and to polishing.

What I claim is:—

1. A process of utilizing natural ivory scrap, consisting in washing the ivory scrap in dilute soda lye, rinsing the washed scrap, classifying the rinsed and washed product according to size, mixing the rinsed and washed product with phenol, subjecting the mixture to the action of steam to produce phenic ivory, and combining the phenic ivory with formaldehyde.

2. A process of utilizing natural ivory scrap consisting in washing the ivory scrap in dilute soda lye, rinsing the washed product, mixing the rinsed and washed product with phenol in the proportions of 5 parts of scrap to 1 part of phenol, subjecting the mixture to the action of steam under a pressure of about 60 lbs. per square inch to produce phenic ivory, and combining the phenic ivory with formaldehyde.

3. A process of utilizing natural ivory scrap consisting in washing the ivory scrap in dilute soda lye, rinsing the washed product, mixing the rinsed and washed product with phenol in the proportions of 5 parts of scrap to 1 part of phenol, subjecting the mixture to the action of steam under a pressure of about 60 lbs. per square inch to produce phenic ivory, reducing the phenic ivory to an impalpable powder, mixing said powder with phenol, formaldehyde and ammonia in the proportions of 60 parts by weight of powder, 25 parts of phenol, 60 parts of formaldehyde and 10 parts of ammonia, and bringing the mixture to a boil to effect condensation.

4. A process of utilizing natural ivory scrap consisting in washing the ivory scrap in dilute soda lye, rinsing the washed product, mixing the rinsed and washed product with phenol in the proportions of 5 parts of scrap to 1 part of phenol, subjecting the mixture to the action of steam under a pressure of about 60 lbs. per square inch to produce phenic ivory, mixing the phenic ivory with phenol, formaldehyde and ammonia, bringing the mixture to a boil to effect incomplete condensation, separating the pasty mass from the liquid product of condensation, casting the mass, and baking the casting under pressure at a temperature not exceeding 200° C.

5. A composition of matter consisting of natural ivory scrap combined with a phenol-formaldehyde resin.

6. A composition of matter consisting of natural ivory scrap combined with a condensation product formed from phenol and a material taken from the group consisting of trioxymethylene, paraformaldehyde, methylal and hexamethylene-tetramine.

In testimony whereof I have signed my name to this specification.

EMILE BORMANS.